United States Patent
Wang et al.

(10) Patent No.: US 9,762,758 B1
(45) Date of Patent: Sep. 12, 2017

(54) SYSTEM AND METHOD FOR REMOTE MONITORING OF DOCUMENT PROCESSING DEVICE

(71) Applicants: Kabushiki Kaisha Toshiba, Minato-ku (JP); Toshiba TEC Kabushiki Kaisha, Shinagawa-ku (JP)

(72) Inventors: Jianxin Wang, Irvine, CA (US); Louis Ormond, Irvine, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 15/134,049

(22) Filed: Apr. 20, 2016

(51) Int. Cl.
- *G06F 3/12* (2006.01)
- *H04N 1/00* (2006.01)
- *H04N 1/32* (2006.01)
- *G06K 15/00* (2006.01)

(52) U.S. Cl.
CPC ..... *H04N 1/00323* (2013.01); *H04N 1/00042* (2013.01); *H04N 1/00061* (2013.01); *H04N 1/00079* (2013.01); *H04N 1/00244* (2013.01); *H04N 1/00344* (2013.01); *H04N 1/00976* (2013.01); *H04N 1/32625* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2011/0216359 A1* | 9/2011 | Kamisuwa | G06F 3/12 358/1.15 |
| 2013/0114100 A1* | 5/2013 | Torii | G06F 11/0733 358/1.14 |
| 2015/0146239 A1* | 5/2015 | Anderson | G01S 5/02 358/1.15 |

\* cited by examiner

*Primary Examiner* — Dov Popovici
(74) *Attorney, Agent, or Firm* — Ulmer & Berne LLP

(57) ABSTRACT

A system and method for monitoring of document processing devices for scheduling of service includes a processor, associated memory and a network interface. The network interface is in data communication with a plurality of identifiable multifunction peripherals. Contact data maps each multifunction peripheral to at least one designated contact is stored in the memory. The network interface receives status data from each of the plurality of multifunction peripherals which is stored in the memory. A statistical engine, including the processor and memory calculates trend data from stored status data and generates alerts corresponding to identified multifunction peripherals in accordance with an analysis of the trend data. The network interface communicates the alerts to at least one designated contact in accordance with each identified multifunction peripheral and the contact data.

20 Claims, 7 Drawing Sheets

SYSTEM AND METHOD FOR REMOTE MONITORING OF DOCUMENT PROCESSING DEVICE

TECHNICAL FIELD

This application relates generally to monitoring and servicing of devices. The application relates more specifically to a system and method to facilitate efficient and organized administration or maintenance of multifunction peripherals.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). MFPs are used in connection with example embodiments disclosed in detail below, but it is to be appreciated that any suitable document processing device can be used.

Given the expense in obtaining and maintain MFPs, devices are frequently shared among users via a data network. Users may send document processing jobs, such as a print request, to one or more networked devices. In a typical shared device setting, one or more workstations are connected via a network. When a user wants to print a document, an electronic copy of that document is sent to a document processing device via the network. The user may select a particular device when several are available. Companies may have several or many MFPs available for employee use. The devices maybe distributed on one or more floors or at one or more locations. Jobs may be routed to other available MFPs for processing.

MFPs require periodic maintenance for reasons including device failure or depletion of supplies such as paper, toner, ink or staples. While some maintenance procedures are straightforward, many are complex and require the services of a trained technician. When devices are distributed among different locations, monitoring or maintenance can require significant resources, and having a dedicated technician may not be justifiable or cost effective.

Companies may outsource device maintenance to a service company. Service technicians can be notified by the company when maintenance is required. More recently, devices are networked and include an ability to send a message, such as an e-mail, to a technician charged with maintaining a device when service is required. Service may be due to things such as device failure, but may also include regularly scheduled maintenance intervals. Such intervals may be based on time passage or may be based on machine usage, such as number of copies made. Many devices include counters or other gauges which may communicate status information via an associated network.

It is highly desirable for service technicians to be as efficient as possible. Device outages can lead to lost productivity. Increased efficiency allows for more responsive servicing, and maximizes technician utilization.

SUMMARY

In accordance with an example embodiment of the subject application, a system and method for device event monitoring including a processor and associated memory and a network interface. The network interface is in data communication with a plurality of identifiable multifunction peripherals. Contact data maps each multifunction peripheral to at least one designated contact and is stored in the memory. The network interface receives status data from each of the plurality of multifunction peripherals which is stored in the memory. A statistical engine, including the processor and memory, calculates trend data from stored status data and generates alerts corresponding to identified multifunction peripherals in accordance with an analysis of the trend data. The network interface communicates the alerts to at least one designated contact in accordance with each identified multifunction peripheral and the contact data.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Figure 1:
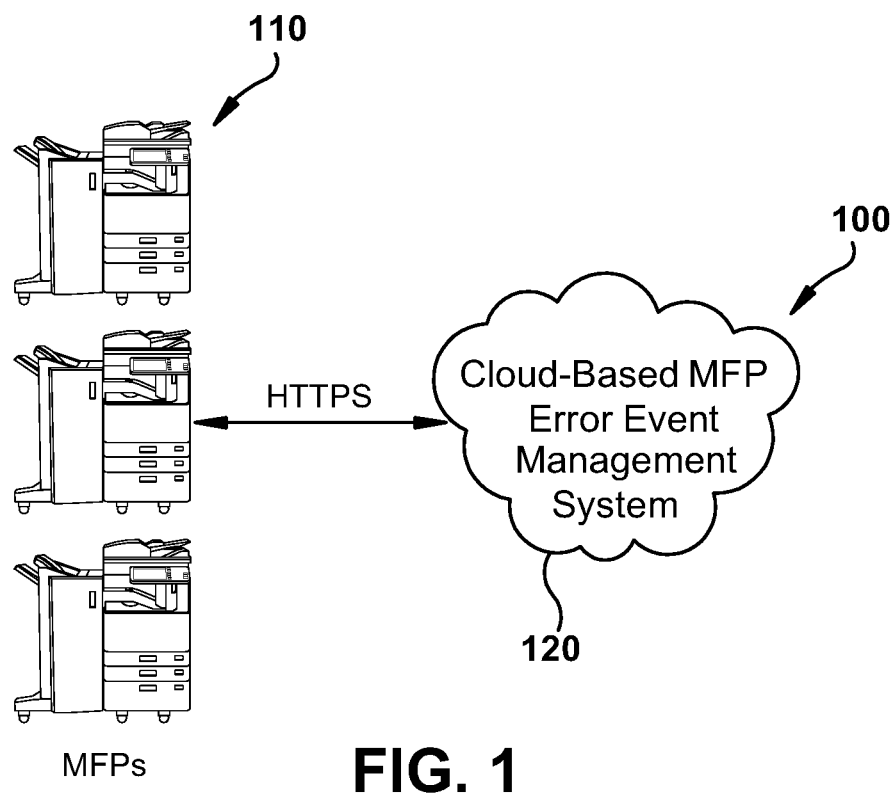
FIG. 1 an example embodiment of a device event monitoring system.

Turning first to FIG. 1, illustrated is an example embodiment of a MFP event management system 100. In the illustrated example, one or more MFPs 110 are in data communication with a network, suitably comprised of a local area network (LAN) or a wide area network (WAN), which may comprise the Internet, or any suitable combination thereof. In the example, a cloud-based management system 120 is provided for monitoring or managing error events in one or more of the MFPs 110. Any suitable data communication protocol may be implemented. In the illustrated example, a secure hypertext transfer protocol (HTTPS) is implemented. Examples error events comprise device or component malfunction, power cycling, or software errors, including failures in applications, operating systems or firmware. Errors may also include depletion of resources, such as toner, paper or ink, causing a device to have halted or have limited function. Communication of error information to the event management system 120 is suitably initiated by a monitoring system integrated into a MFP 110. By way of further example, an MFP 110 suitably maintains a log of events, including error events. Any suitable, detected error event is identified and logged. Data identifying the event or events, along with device identifier, is communicated to the management system 120. Prompt communication of event data allows for real time, or near real time device monitoring. Communication between the error management system 120 and an MFP 110 is suitably continuous, triggered by one or more events, or by a periodic push of information from the device, such as over a set push interval. A data exchange is also suitably initiated from the event management system 120 by continuously or periodically polling MFP 110 devices and pulling event data into the cloud.

Event management system 120 receives event information from the MFPs 110, and provides statistical correlation between frequency of occurrences of certain error events and that of certain hardware failure instances. Event management system 120 further functions to send notifications to subscribers or technicians when a given MFP 110 has reached a pre-defined hardware failure likelihood threshold or formula. This information is suitably geo-mapped evidencing failures of devices in monitored system.

Figure 2:
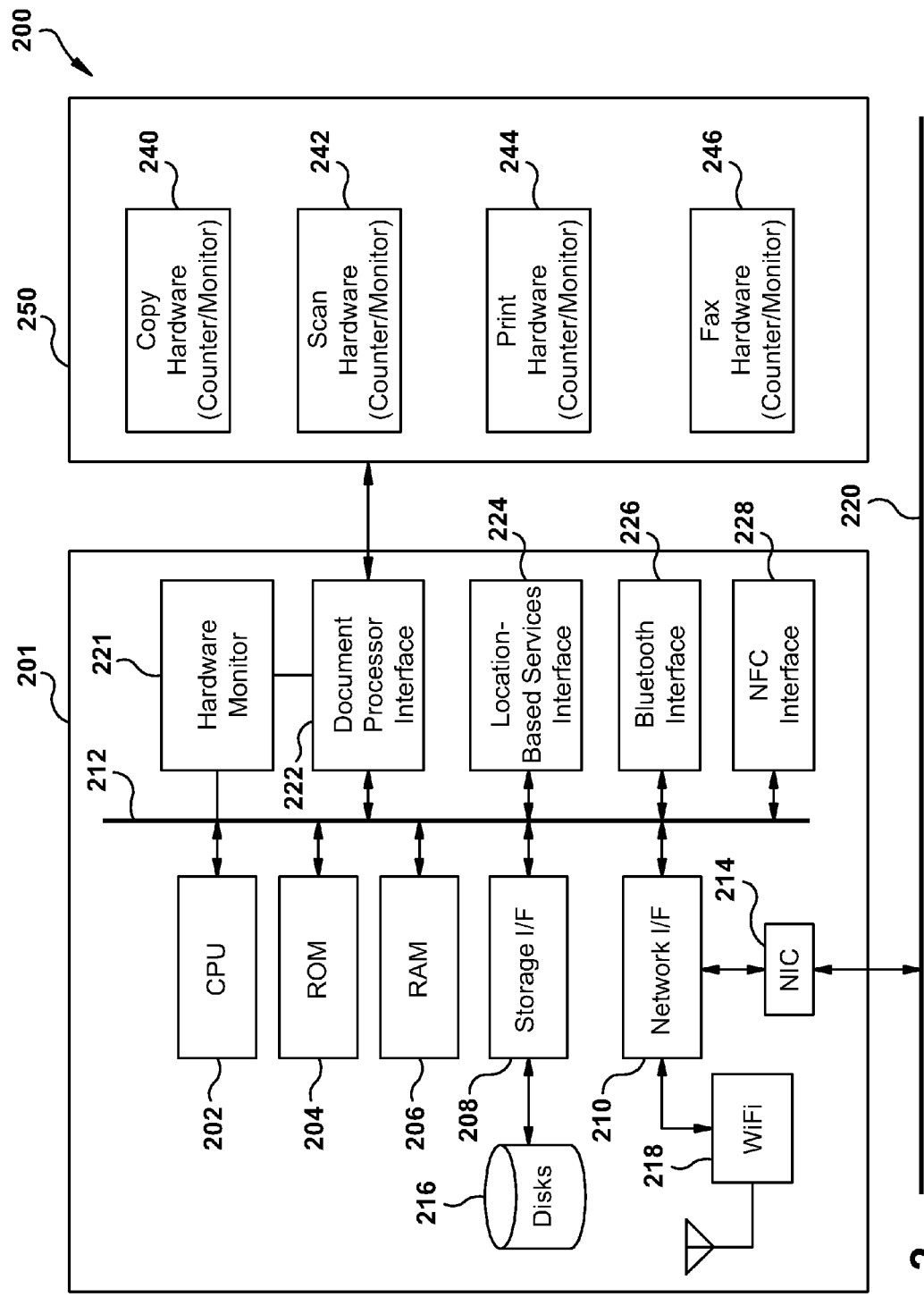
FIG. 2 is an example embodiment of a document rendering system.

Turning now to FIG. 2, illustrated is an example of a document rendering system 200 suitably comprised within an MFP, such as with MFPs 110 of FIG. 1. Included in controller 201 and one or more processors, such as that illustrated by central processor unit (CPU) 202. Each processor is suitably associated with non-volatile memory, such as read only memory (ROM) 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, wireless universal serial bus (wireless USB), satellite, and the like. Example wired interfaces include Ethernet, USB, IEEE 1394 (FireWire), Lightning, telephone line, or the like. Processor 202 can also be in data communication with BLUETOOTH interface 226, and NFC interface 228, either directly as shown or through network interface 218 (not shown.)

Processor 202 can also be in data communication with any suitable user input/output (I/O) interface (not shown) which provides data communication with user peripherals, such as displays, keyboards, mice, track balls, touch screens, or the like. Hardware monitor 221 suitably provides device event data, working in concert with suitable monitoring systems. By way of further example, monitoring systems may include page counters, sensor output, such as consumable level sensors, temperature sensors, power quality sensors, device error sensors, door open sensors, and the like. Data is suitably stored in one or more device logs, such as in storage 216 of FIG. 2.

Also in data communication with data bus 212 is a document processor interface 222 suitable for data communication with MFP functional units 250. In the illustrate example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Additional interfaces are suitably provided within controller 201 include a location-based services (LBS) interface 224. Data relative to device location is suitably channeled to controller 201 via LBS interface 224 from any suitable location system. By way of example, location may be determined by Global Positioning System (GPS) information, cellular location information or network location information, or a combination thereof. Location information is also suitably determined outside of the MFP, such as by a technician who inputs device location information directly to the device.

Figure 3:
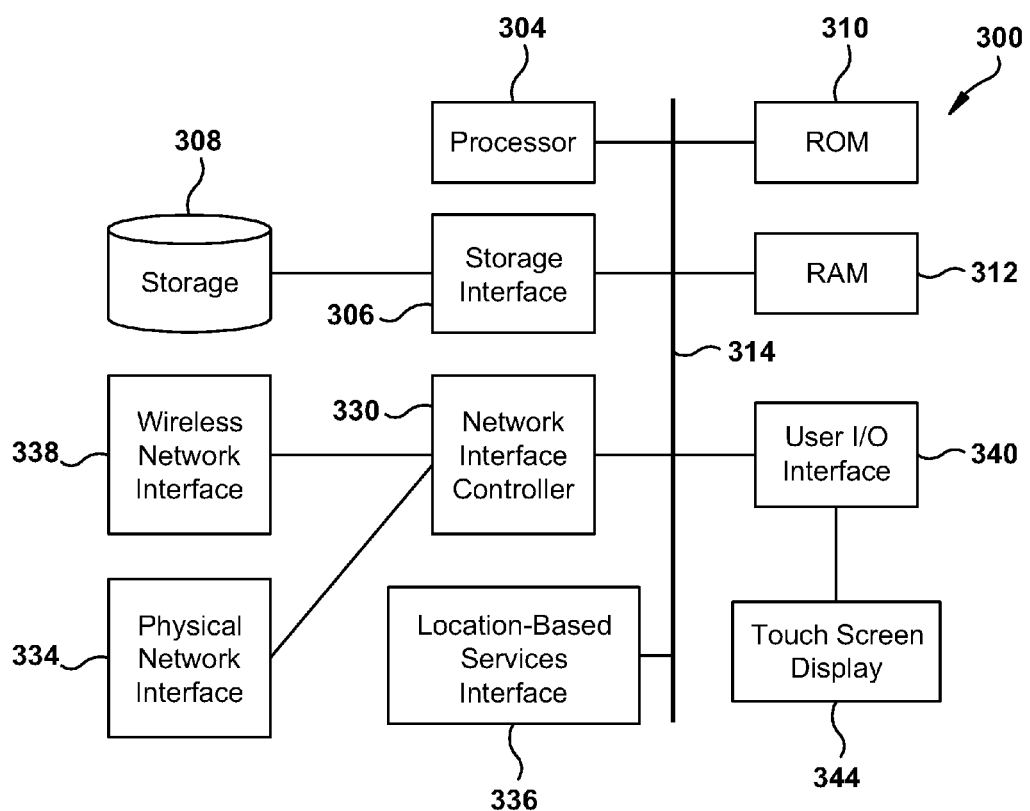
FIG. 3 is an example embodiment of a digital device.

Turning now to FIG. 3, illustrated is an example of a digital device system 300 suitably comprising networked data devices, such as event management system 120 of FIG. 1. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 306 for reading or writing to a data storage system 308, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable wired or physical network connection via physical network interface 334 or to any suitable wireless data connection via wireless network interface 338, such as one or more of the networks detailed above. The system suitably uses an LBS services interface 336 for location based services, such as those described above. By way of example, if multiple error event management systems are used, it may be advantageous to have monitoring of devices completed by a local or more proximate event management system.

Processor 304 is also in data communication with a user input/output (I/O) interface 340 which provides data communication with user peripherals, such as display 344, as well as keyboards, mice, track balls, touch screens, or the like. It will be understood that functional units are suitably comprised of intelligent units, including any suitable hardware or software platform.

Figure 4:
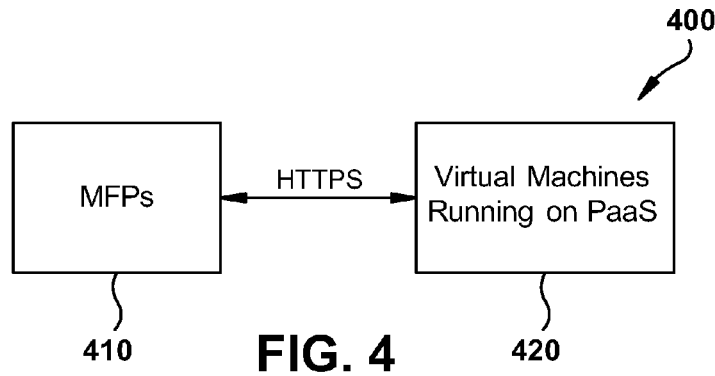
FIG. 4 is an example embodiment of an event management system.

Referring now to FIG. 4, illustrated is an example embodiment of event management system 400. One or more MFPs 410 are in data communication with event manager 420. In the example embodiment, event manager 420 is comprised of a plurality of virtual machines implemented as a platform-as-a-service (Paas).

Figure 5:
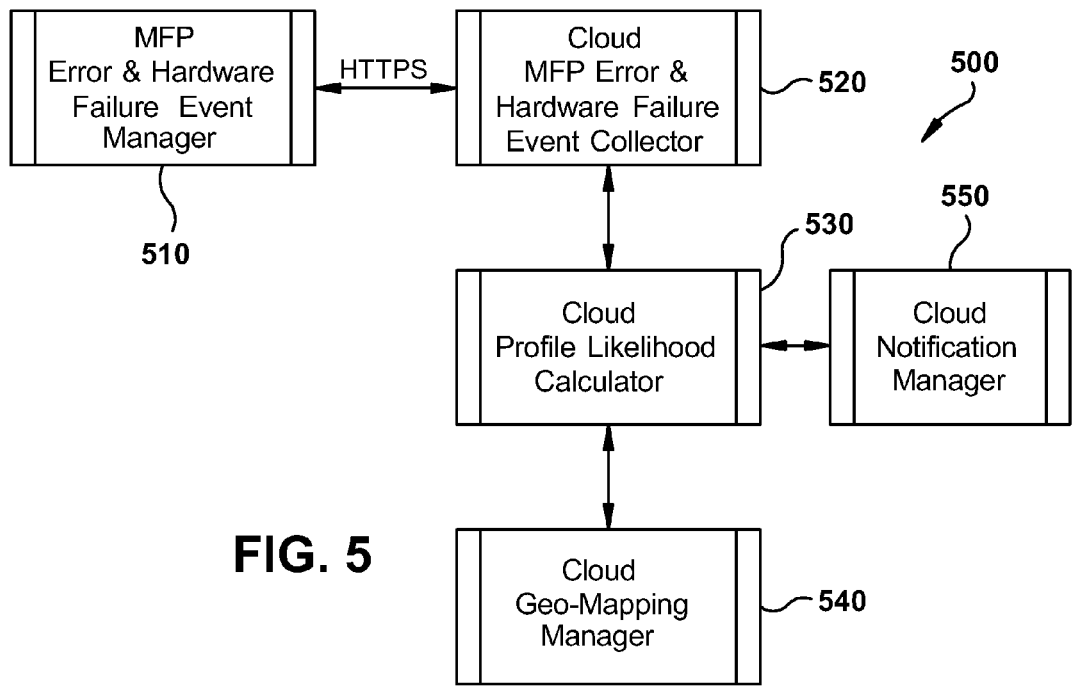
FIG. 5 is an example embodiment of a software module.

FIG. 5 illustrates example embodiments of software modules for operation of an event manager 500. MFP event data, such as error and hardware event data, is obtained at module 510 associated with each monitored MFP. Module 510 communicates event data to event collector module 520, and the information is communicated to a profiling module 530 for statistical analysis. Data for such statistical analysis is suitably updated with information from additional events as they arrive, thus providing for ongoing, fluid profiling and analysis. Such profiling is accomplished with LBS data suitably provided from geo-mapping manager module 540. Data analysis and correlation completed by profiling module generates alerts, such as when thresholds are achieved or approached, and this information is communicated to notification manager module 550 for relaying to one or more contacts identified with devices or device groupings. Contacts may include subscribers who have registered to receive notices, such as technicians, service agencies or managers.

Figure 6:
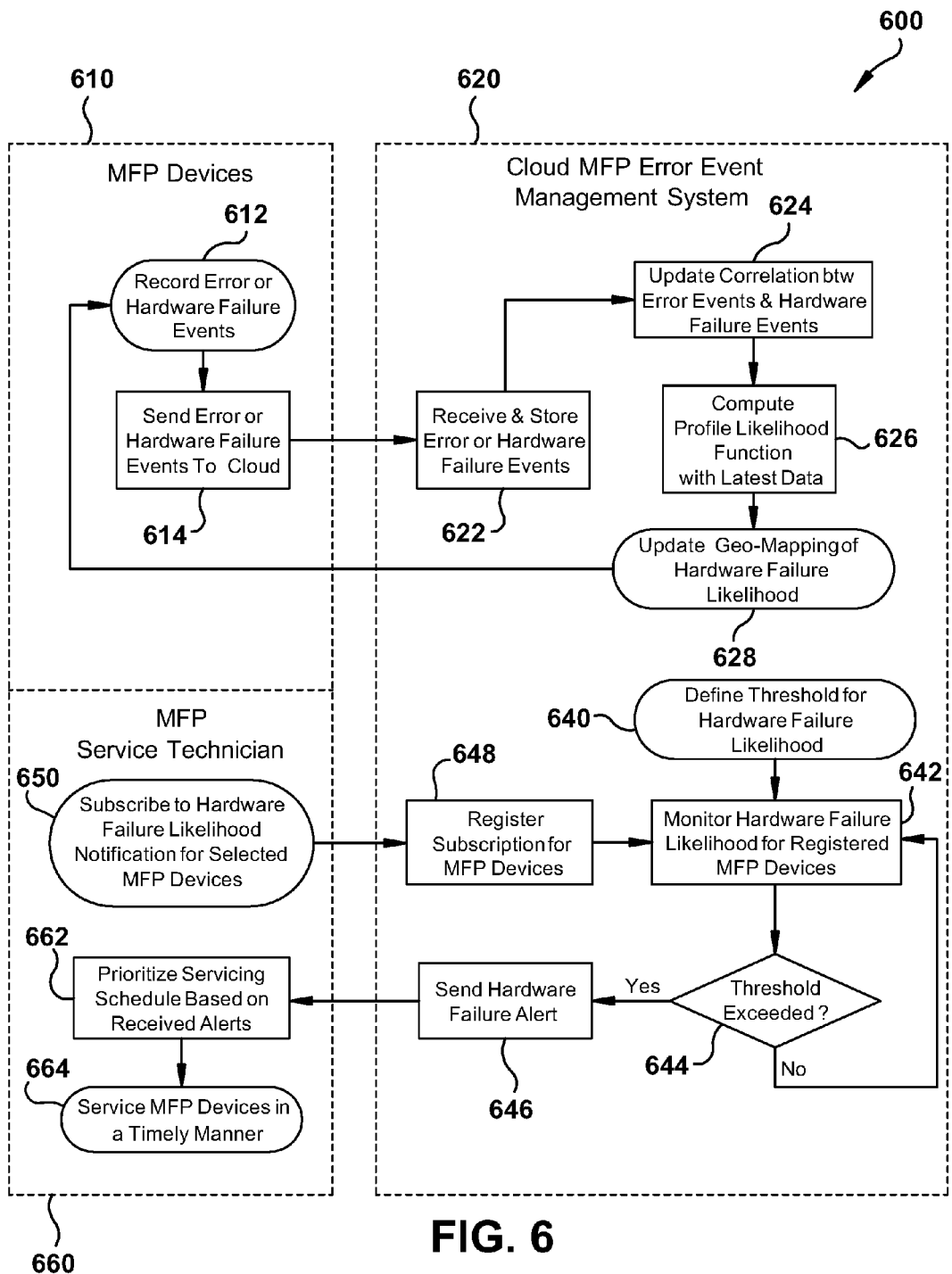
FIG. 6 is an example embodiment of a flowchart for device event monitoring.

FIG. 6 illustrates a flowchart 600 of an example embodiment of device event monitoring and reporting, data analysis and alert notification. One or more MFP devices 610 function to record events, such as errors or hardware failures, at block 612. Event data corresponding to such events is communicated at block 614 to event management system 620 as detailed above.

Event management system 620 receives event data at block 622, storing them for future reference. While error events and hardware failure events are illustrated, additional data is suitably captured or input as will be detailed below. Event data is correlated between error events and hardware failure events at block 624, after which profiling of the data and trend analysis is completed at block 626. Resultant computations are analyzed relative to MFP location at block 628, and the information suitably communicated back to MFPs 610 at block 612.

Thresholds for notifications relative to events, such as likely hardware failures, are defined at block 640 and compared with monitored hardware usage at block 642. A determination is made at block 644 as to whether a corresponding threshold has been achieved. If so, a hardware failure alert is communicated at block 646 to a service technician denoted at block 660. The technician, as well as other people or organizations, can subscribe to receive hardware failure alerts at block 650. Event management system 620 receives the subscriptions to receive alerts at block 648. The technician prioritizes received alerts at block 662 for servicing. While a technician may prioritize directly, such prioritization is suitably accomplished by an associated digital device based on factors including but not limited to severity of errors, availability of parts, distance between affected devices, device downtime period, company holiday schedule, or fee-based prioritization. The technician services the MFP devices at block 664.

Figure 7:
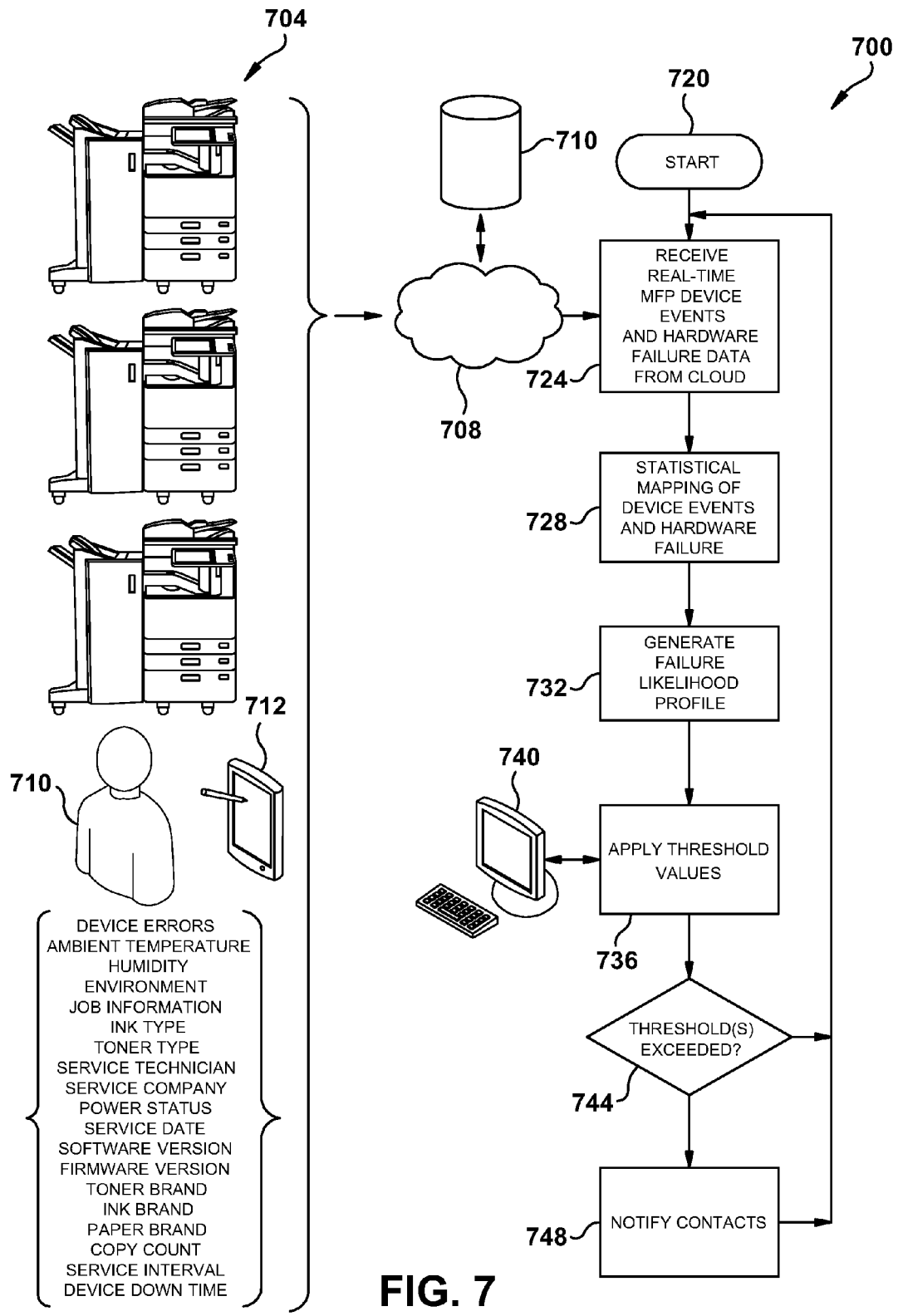
FIG. 7 is an example embodiment of a flowchart for device monitoring, data analysis and event reporting.

Referring next to FIG. 7, illustrated is flowchart 700 of an example embodiment of device monitoring, data analysis and event reporting. One or more MFPs 704 provide event data to service cloud 708 and stored in associated data storage 710. As noted in the figure, event data suitably comprises one or more of device errors, ambient temperature, humidity, job information, ink type, toner type, service technician, service company, power status, service date, software version, firmware version, toner brand, ink brand, paper brand, copy count, service interval or device down time, among other suitable event data. While automated monitoring is suitably implemented, it will be appreciated that one or more types of event data can be entered directly by a service technician 710, such on an MFP 704 itself or on a personal data device 712.

One or more such event data types can be useful in trend analysis and are obtainable from device logs or monitors. By way of particular example, it could be determined that devices serviced by a particular technician have a higher failure rate, indicating that additional training or replacement may be in order. Similarly, the analysis can reveal problems with distributer capabilities as a whole, or problems in supply chains, for example faulty parts or long lead times in obtaining parts for repair. In an embodiment, the analysis can be use to adjust parts ordering and inventory levels in accordance with probable device problems. The analysis can also reveal problems with power outages or power quality. Locations with poor power conditioning or multiple power outages may be more likely to have certain types of device failures. Logs can provide information as to abnormal shutdown and restart times, and can be used to calculate how long and how frequently devices are shut down due to power issues.

Analysis can be performed on data from machine logs to develop profiles of how devices are used and environmental conditions. Profiles can be determined for job sizes, color versus black-and-white printing, and job type including printing, copying, scanning, and faxing. Profiles can be determined for consumables used such as paper, toner, and ink, and whether such consumables were provided by a third party. In a configuration, consumables can be identified by chips or labels on containers, and can be entered by a technician during service calls. Profiles can be determined for failure rates relative to software and firmware versions. Profiles can be determined based on machine location, machine environment such as temperature, humidity, and particulate levels or air quality. In a configuration, the technician can log environmental information in the course of performing service call visits.

Example operation within an event manager suitably commences at block 720, after which event data is received from service cloud 708 at block 724. Statistical mapping of device event data, suitably with associated location data, is completed at block 728, and failure likelihood generated at block 732. Threshold values are applied at block 736, which threshold values are suitably set by an associated user at terminal 740. A test is made at block 744 as to whether one or more thresholds have been exceeded. If so, contacts associated with devices or servicing are notified at block 748 in accordance with prior registration. If no thresholds are exceeded, or once contacts have been notified, the process returns to block 724 and data is updated with the newly acquired information.

Figure 8:
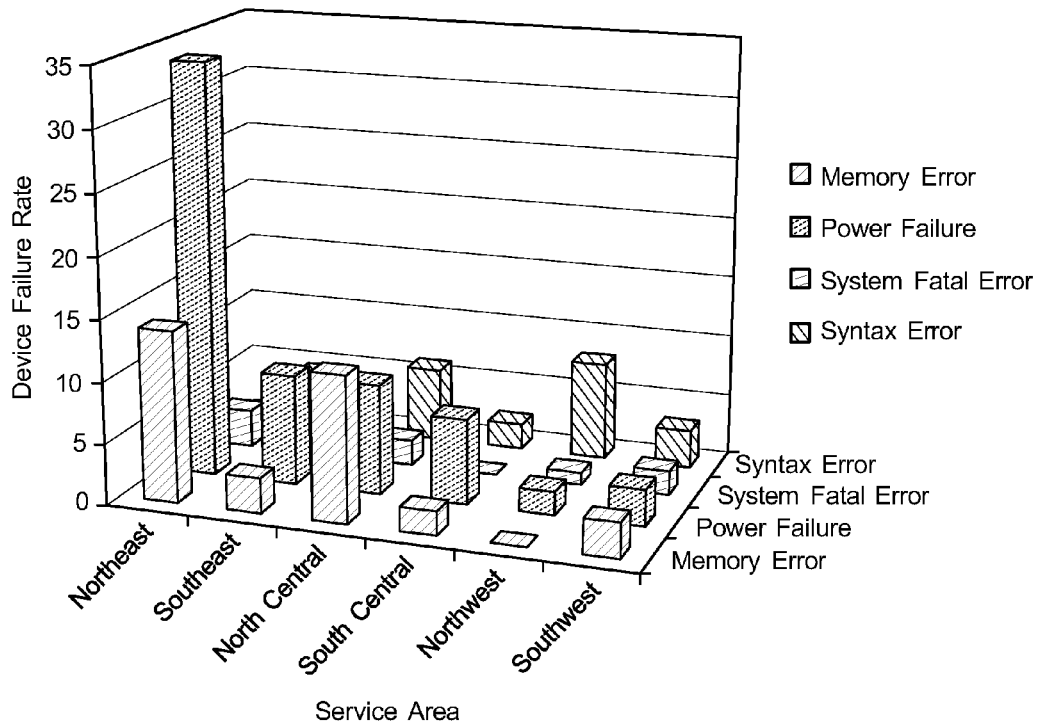
FIG. 8 is an example embodiment of a graph of event data collection and categorization.

FIG. 8 is a graph of an example embodiment of event data collection and categorization in connection with the embodiments described above. The graph illustrates a relationship between device failure rate, failure types and geographic region. It is understood that this rendering is by way of example only, and that any location area or device grouping is suitably used. Also, additional or alternative errors or events are suitably tracked. In the example, it will be noted that there is a substantially greater chance of experiencing a device power failure in the northeast as opposed to the northwest.

Figure 9:
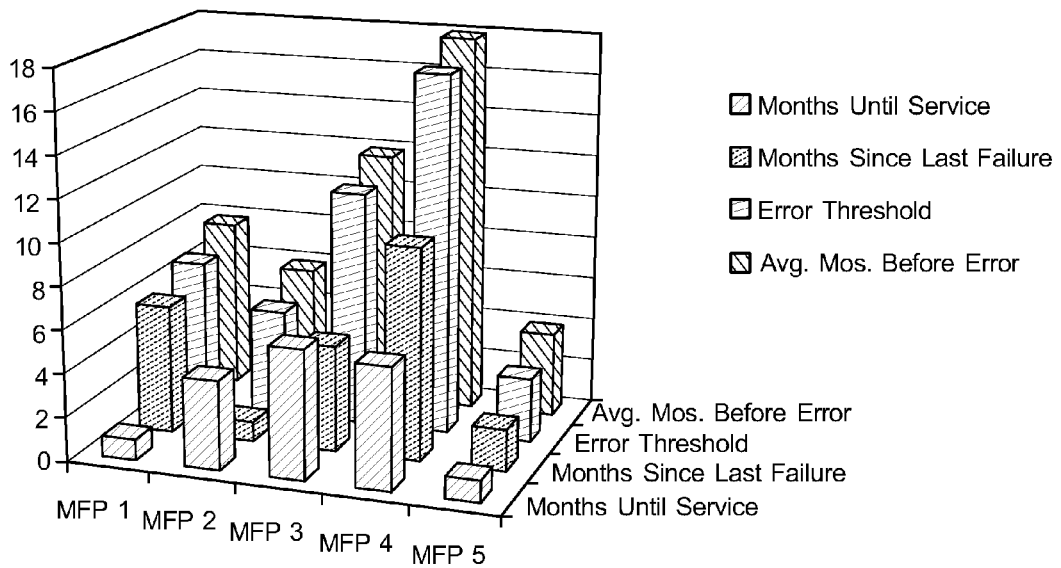
FIG. 9 is an example embodiment of a graph of event trend analysis.

FIG. 9 is a graph of an example embodiment of event trend analysis wherein an average time before an error for a particular MFP. It is understood that any error or errors, individually or collectively, can be used in connection with analysis. In the illustrated example, an ongoing average of months before an error is illustrated, along with a specified error threshold to trigger a service call. The graph further illustrates a time until servicing given the selected threshold. It will be understood further that devices for servicing are suitably bundled for relative location to maximize servicing efficiency.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
a network interface configured for data communication with a plurality of identifiable multifunction peripherals,
the network interface configured to receive status data from each of the plurality of multifunction peripherals;
a processor and associated memory,
the memory configured to store contact data mapping each multifunction peripheral to at least one designated contact and device location data corresponding to a location of each of the plurality of multifunction peripherals,
the processor configured to store received status data in the memory; and
a statistical engine, including the processor and the memory, configured to calculate trend data indicative of failure rates and likelihood of failure of each of the plurality of multifunction peripherals in accordance with the stored status data,
wherein the processor is further configured to generate multifunction peripheral device clusters comprising a geographically-proximate grouping of multifunction peripherals in accordance with failure rates and location data;
wherein the processor is further configured to selectively generate alerts corresponding to identified multifunction peripheral device clusters in accordance with an analysis of the trend data, and
wherein the network interface is further configured to communicate the alerts to at least one designated contact in accordance with each identified multifunction peripheral and the contact data.

2. The system of claim 1 wherein the processor is further configured to generate mapping data corresponding to relative locations of each of the multifunction peripherals identified by the location data,
wherein the processor is further configured to generate indicator data for mapped multifunction peripherals in accordance with the mapping data, and
wherein the processor is further configured to generate service area data corresponding to locations of each of the multifunction peripherals and indicator data associated therewith.

3. The system of claim 2 wherein the processor is further configured to generate service data corresponding to at least one device service area in accordance with the service area data, and further comprising:
an output configured to communicate the device service area to an associated technician.

4. The system of claim 3 wherein the network interface is further configured for receiving the status data comprising data associated with an error condition corresponding to at least one of the multifunction peripherals.

5. The system of claim 3 wherein the network interface is further configured for receiving the status data comprised of machine environment data corresponding a physical environment of at least one of the multifunction peripherals.

6. The system of claim 5 wherein the machine environment data is comprised of temperature data from a multifunction peripheral heat sensor.

7. The system of claim 4 wherein the processor is further configured to generate alerts in accordance with data corresponding to a preselected alert threshold.

8. A method comprising:
communicating data communication with a plurality of identifiable multifunction peripherals via an associated data network;
storing contact data mapping each multifunction peripheral to at least one designated contact,
storing device location data corresponding to a location of each of the plurality of multifunction peripherals;
receiving status data from each of the plurality of multifunction peripherals;
storing received status data in a memory;
calculating trend data indicative of failure rates and likelihood of failure of each of the plurality of multifunction peripherals from the stored status data via a statistical engine including a processor and the memory;
generating multifunction peripheral device clusters comprising a geographically-proximate grouping of multifunction peripherals in accordance with the failure rates and the device location data;
generating alerts corresponding to identified multifunction peripheral device clusters in accordance with an analysis of the trend data; and
communicating the alerts to at least one designated contact in accordance with each identified multifunction peripheral and the contact data.

9. The method of claim 8 further comprising:
generating mapping data corresponding to relative locations of each of the multifunction peripherals identified by the device location data;
generating indicator data for mapped multifunction peripherals in accordance with the mapping data; and
generating service area data corresponding to locations of each of the multifunction peripherals and the indicator data associated therewith.

10. The method of claim 9 further comprising:
generating service data corresponding to at least one device service area in accordance with the service area data; and
communicating, via an output, the device service area to an associated technician.

11. The method of claim 10 further comprising receiving the status data comprising data associated with an error condition corresponding to at least one of the multifunction peripherals.

12. The method of claim 11 further comprising generating the alerts in accordance with data corresponding to preselected alert threshold.

13. The method of claim 10 further comprising receiving the status data comprising machine environment data corresponding a physical environment of at least one of the multifunction peripherals.

14. The method of claim 13 wherein the machine environment data is comprised of temperature data from a multifunction peripheral heat sensor.

15. A system comprising:
a network interface configured for data communication with a plurality of document processing devices,
the network interface configured for ongoing receipt of event data from each document processing device;
a memory configured to store, for each document processing device, setup data specifying a device identifier, device location and designated service entity,
the memory configured to store received event data;
a processor configured to catalog received event data into a plurality of categories of event data in accordance with characteristics thereof and timing data indicative of a duration between events associated with a single document processing device of the plurality of document processing devices, the processor configured to generate trend data indicative of device failure rates accordance with one or more cataloged events and associated timing data, the processor configured to apply the trend data to the event data for each of the plurality of document processing devices to calculate a likelihood of failure factor for each document processing device, the processor configured to generate document processing device clusters comprising a geographically-proximate grouping of document processing devices in accordance failure factors, and the processor configured to communicate data corresponding to the device clusters and data corresponding to a calculated likelihood of failure to a commonly associated service entity.

16. The system of claim 15 wherein the network interface is configured for data communication with device logs from each of the plurality of document processing devices, and wherein the event data is comprised of information from the device logs.

17. The system of claim 16 wherein the network interface is configured for data communication with a sensor from each of the plurality of document processing devices, and wherein the event data is comprised of information from the sensor.

18. The system of claim 17 wherein the sensor is comprised of a paper document counter.

19. The system of claim 18 wherein the network interface is configured for data communication with a portable, personal data device, and wherein the event data is comprised of user-supplied device data.

20. The system of claim 19 wherein the processor is further configured to communicate the data corresponding to the device clusters and corresponding to a calculated likelihood of failure to the commonly associated service entity when the likelihood of failure exceeds a preselected threshold value.

* * * * *